United States Patent
Tighe et al.

(10) Patent No.: US 10,522,855 B2
(45) Date of Patent: Dec. 31, 2019

(54) METHOD FOR CREATING AN OXYGEN DEPLETED GAS IN A FUEL CELL SYSTEM

(71) Applicant: GM GLOBAL TECHNOLOGY OPERATIONS LLC, Detroit, MI (US)

(72) Inventors: Thomas W. Tighe, Pulaski, NY (US); Steven G. Goebel, Victor, NY (US); Gary M. Robb, Honeoye Falls, NY (US); Abdullah B. Alp, Dearborn, MI (US); Balasubramanian Lakshmanan, Rochester Hills, MI (US); Joseph N. Lovria, Davisburg, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 894 days.

(21) Appl. No.: 14/886,928

(22) Filed: Oct. 19, 2015

(65) Prior Publication Data

US 2016/0043417 A1   Feb. 11, 2016

Related U.S. Application Data

(62) Division of application No. 12/636,343, filed on Dec. 11, 2009.

(51) Int. Cl.
| | | |
|---|---|---|
| *H01M 8/04223* | (2016.01) | |
| *H01M 8/04302* | (2016.01) | |
| *H01M 8/04303* | (2016.01) | |
| *H01M 8/04955* | (2016.01) | |
| *H01M 8/04089* | (2016.01) | |
| *H01M 8/0438* | (2016.01) | |
| *H01M 8/0444* | (2016.01) | |
| *H01M 8/04746* | (2016.01) | |
| *H01M 8/04791* | (2016.01) | |
| *H01M 8/04701* | (2016.01) | |

(Continued)

(52) U.S. Cl.
CPC ... *H01M 8/04231* (2013.01); *H01M 8/04089* (2013.01); *H01M 8/04223* (2013.01); *H01M 8/04302* (2016.02); *H01M 8/04303* (2016.02); *H01M 8/04395* (2013.01); *H01M 8/04455* (2013.01); *H01M 8/04701* (2013.01); *H01M 8/04746* (2013.01); *H01M 8/04753* (2013.01); *H01M 8/04798* (2013.01); *H01M 8/04955* (2013.01); *H01M 8/04126* (2013.01); *H01M 8/04559* (2013.01); *H01M 2250/20* (2013.01); *Y02T 90/32* (2013.01)

(58) Field of Classification Search
CPC ......... H01M 8/04228; H01M 8/04303; H01M 8/04955
See application file for complete search history.

(56) References Cited

U.S. PATENT DOCUMENTS

| | | |
|---|---|---|
| 6,514,635 B2 | 2/2003 | Van Dine et al. |
| 6,939,633 B2 | 9/2005 | Goebel |

(Continued)

FOREIGN PATENT DOCUMENTS

WO   WO-2008047932 A1 *   4/2008   ........ H01M 8/04179

*Primary Examiner* — Robert S Carrico
(74) *Attorney, Agent, or Firm* — Cantor Colburn LLP

(57) ABSTRACT

A method for creating an oxygen depleted gas in a fuel cell system, including operating a fuel cell stack at a desired cathode stoichiometry at fuel cell system shutdown to displace a cathode exhaust gas with an oxygen depleted gas. The method further includes closing a cathode flow valve and turning off a compressor to stop the flow of cathode air.

13 Claims, 2 Drawing Sheets

(51) Int. Cl.
*H01M 8/04119* (2016.01)
*H01M 8/04537* (2016.01)

(56) References Cited

U.S. PATENT DOCUMENTS

| | | | |
|---|---|---|---|
| 7,291,411 | B2 | 11/2007 | Pettit et al. |
| 7,479,337 | B2 | 1/2009 | Goebel |
| 2007/0087233 | A1 | 4/2007 | Blaszczyk et al. |
| 2007/0122664 | A1 | 5/2007 | Spare |
| 2007/0122669 | A1* | 5/2007 | Kusano ............... B60L 11/1881 429/414 |
| 2007/0154742 | A1 | 7/2007 | Tang et al. |
| 2008/0038602 | A1 | 2/2008 | Yu et al. |
| 2008/0145716 | A1 | 6/2008 | Yu et al. |
| 2009/0035630 | A1* | 2/2009 | Kumada ........... H01M 8/04238 429/430 |
| 2009/0263683 | A1 | 10/2009 | Baumann et al. |
| 2010/0028738 | A1* | 2/2010 | Kajiwata ........... H01M 8/04179 429/444 |

* cited by examiner

METHOD FOR CREATING AN OXYGEN DEPLETED GAS IN A FUEL CELL SYSTEM

CROSS-REFERENCE TO RELATED APPLICATIONS

This application is a divisional application of U.S. Utility application Ser. No. 12/636,343, titled Fuel Cell Operational Methods for Oxygen Depletion at Shutdown, filed Dec. 11, 2009.

BACKGROUND OF THE INVENTION

Field of the Invention

This invention relates generally to a system and method for depleting the oxygen in a fuel cell stack and, more particularly, to a system and method for creating a volume of oxygen depleted gas throughout as much of the cathode sub-system as possible.

Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes, or catalyst layers, typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, the gas diffusion layer (GDL), that protects the mechanical integrity of the membrane and also helps in uniform reactant humidity diffusion. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. The fuel cell stack also receives an anode hydrogen input gas that flows into the anode side of the stack. Not all of the oxygen is consumed by the stack and some of the air is output as a cathode exhaust gas that may include water as a by-product of the chemical reaction taking place in the stack.

The fuel cell stack includes a series of bipolar plates positioned between the several MEAs in the stack, where the bipolar plates and the MEAs are positioned between two end plates. The bipolar plates include anode side and cathode side flow distributors, or flow fields, for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Water is generated as a by-product of the stack operation, therefore, the cathode exhaust gas from the stack will typically include water vapor and liquid water. It is known in the art to use a water vapor transfer (WVT) unit to capture some of the water in the cathode exhaust gas, and use the water to humidify the cathode input airflow. Water in the cathode exhaust gas at one side of the water transfer elements, such as membranes, is absorbed by the water transfer elements and transferred to the cathode air stream at the other side of the water transfer elements.

When a fuel cell system is shut down, unreacted hydrogen gas remains in the anode side of the fuel cell stack. This hydrogen gas is able to diffuse through or cross over the membrane and react with the oxygen in the cathode side. As the hydrogen gas diffuses to the cathode side, the total pressure on the anode side of the stack is reduced, where it is possible to reduce the pressure below ambient pressure. This pressure differential can draw air from ambient into the anode side of the stack. It is also possible for air to enter the anode by diffusion from the cathode. When the air enters the anode side of the stack it can generate air/hydrogen fronts that creates a short circuit in the anode side, resulting in a lateral flow of hydrogen ions from the hydrogen flooded portion of the anode side to the air-flooded portion of the anode side. This current combined with the high lateral ionic resistance of the membrane produces a significant lateral potential drop (~0.5 V) across the membrane. This produces a local high potential between the cathode side opposite the air-filled portion of the anode side and adjacent to the electrolyte membrane that drives rapid carbon corrosion, and causes the electrode carbon layer to get thinner. This decreases the support for the catalyst particles, which decreases the performance of the fuel cell.

In automotive applications, there are a large number of start and stop cycles over the life of the vehicle and the life of the fuel cell system each of which may generate an air/hydrogen front as described above. An average vehicle can experience 40,000 startup/shutdown cycles over its useful life. Start and stop cycles are damaging to the fuel cell system due to the potential which may be generated by an air/hydrogen front, and the best demonstrated mitigation of damage still causes approximately 2 to 5 μV of degradation per start and stop cycle. Thus, the total degradation over the 40,000 start and stop cycle events can exceed 100 mV. However, by not allowing air to enter the fuel cell stack while the fuel cell system is shutdown, damage during subsequent restarts may be reduced or prevented.

It is known in the art to purge the hydrogen gas out of the anode side of the fuel cell stack at system shutdown by forcing air from the compressor into the anode side at high pressure. However, the air purge creates the air/hydrogen front discussed above that causes at least some corrosion of the carbon support structure.

Another known method in the art is to provide cathode re-circulation to reduce cathode corrosion at system shutdown. Particularly, it is known to pump a mixture of air and a small amount of hydrogen through the cathode side of the stack at system shutdown so that the hydrogen and oxygen combine in the cathode side to reduce the amount of oxygen, and thus the potential that causes carbon corrosion.

It is also known to stop the cathode air flow while maintaining positive anode side hydrogen pressure at shutdown, and then to apply a load to the stack to allow the oxygen to be consumed by hydrogen, followed by closing the inlet and outlet valves of the anode and cathode sides. While it has been shown that these techniques do help to mitigate corrosion of the carbon support, these techniques may not remove all of the oxygen, especially from the volumes beyond the stack, or add the complexity of a cathode recycle system. Therefore, there is a need in the art for an improved or simplified way to prevent oxygen rich air from being present at start-up of a fuel cell system.

SUMMARY OF THE INVENTION

In accordance with the teachings of the present invention, a method for creating an oxygen depleted gas in a fuel cell system is disclosed. The method includes operating a fuel cell stack at a desired cathode stoichiometry at fuel cell system shutdown to displace a cathode exhaust gas with an oxygen depleted gas. The method further includes closing a cathode flow valve and turning off a compressor to stop the flow of cathode air.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for depleting oxygen in a fuel cell stack is merely exemplary in nature, and is in no way intended to limit the invention or its applications or uses.

Figure 1:
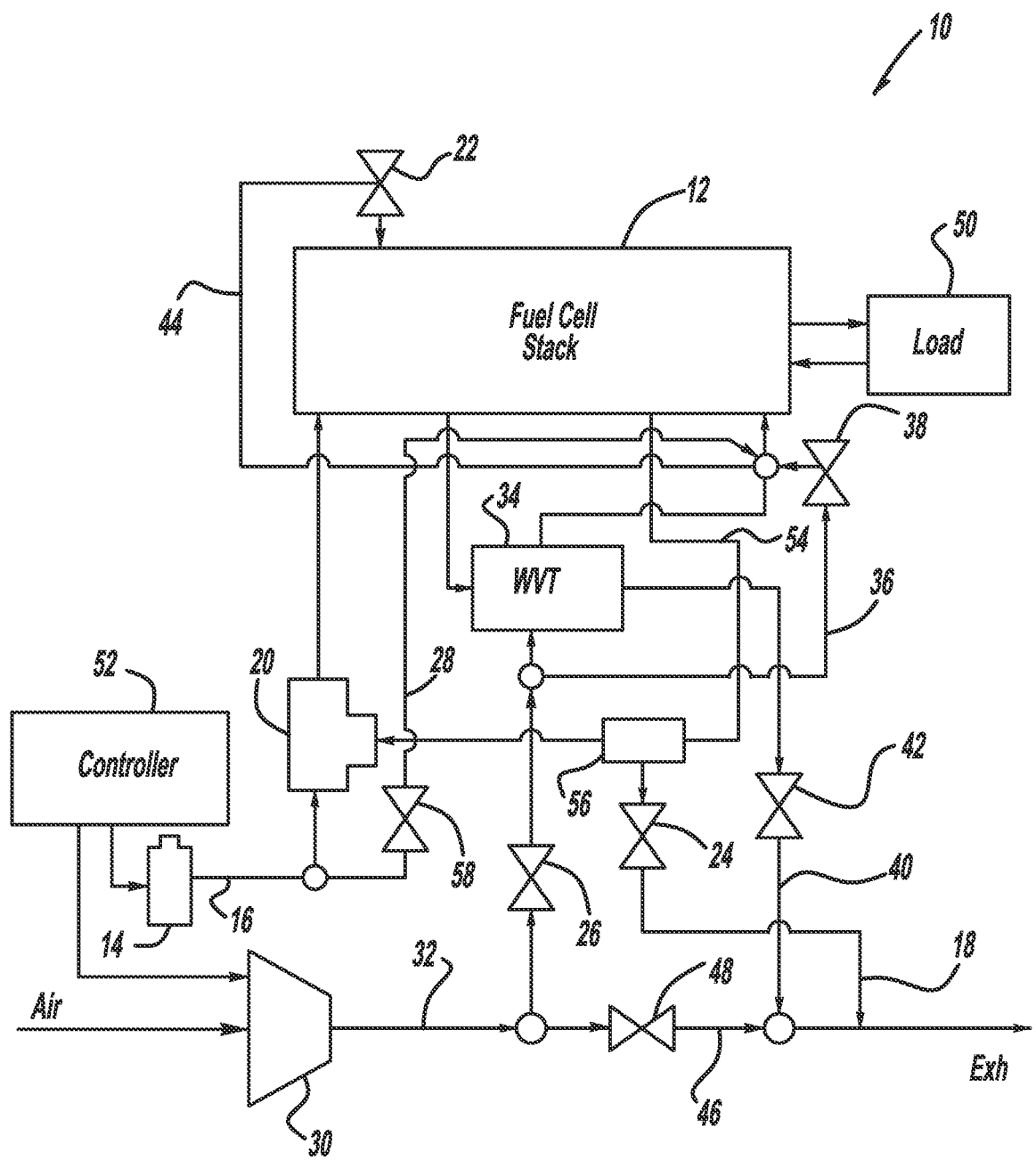
FIG. 1 is a schematic block diagram of a fuel cell system.

FIG. 1 is a schematic block diagram of a fuel cell system 10 including a fuel cell stack 12 having an anode side and a cathode side. An injector 20 injects hydrogen into the fuel cell stack 12 from a hydrogen source 14 on an anode input line 16. The injector 20 can be any injector, injector/ejector, or bank of injectors suitable for the purposes described herein. An anode purge valve 22 is provided on the anode side of the stack 12 to purge the anode with fresh hydrogen, and to receive an oxygen depleted gas, as will be described in more detail below. In an alternate embodiment, a blocking valve or a stationary recirculation pump could be used to restrict the recirculation path.

In this embodiment, the fuel cell system 10 employs anode recirculation where an anode recirculation gas is output from the stack 12 and is recirculated back to the anode input by an anode recirculation line 54 through the injector 20 to reduce the amount of hydrogen gas being discharged from the stack 12. Water is removed from the recirculated anode gas by a water separation device 56 provided in the anode recirculation line 54. The water separation device 56 collects and holds water in a manner well understood to those skilled in the art. A bleed/drain valve 24 is provided in an anode exhaust gas line 18 and is periodically opened to drain water from a holding tank within the water separation device 56, and is also periodically opened to remove nitrogen from the anode side of the stack 12 based on a schedule well understood to those skilled in the art. In an alternate embodiment, a separate bleed valve and drain valve could be used without departing from the scope of the present invention.

A compressor 30 provides an air flow to the cathode side of the fuel cell stack 12 on cathode input line 32 through a water vapor transfer (WVT) unit 34 that humidifies the cathode input air. A cathode exhaust gas line 40 directs the cathode exhaust to the WVT unit 34 to provide the humidity to humidify the cathode input air. A by-pass line 36 is provided around the WVT unit 34 and a by-pass valve 38 is provided in the by-pass line 36 and is controlled to selectively redirect the cathode input air through or around the WVT unit 34 to provide the desired amount of humidity to the cathode input air. Alternatively, the cathode by-pass line 36 may be provided around the WVT unit 34 on the cathode exhaust line 40, although not shown in this embodiment. A cathode by-pass line 46 is provided to connect the cathode input line 32 and the cathode exhaust line 40 to allow air from the compressor 30 to by-pass the stack 12. A cathode by-pass valve 48 is provided to selectively control the amount of air flow through the cathode by-pass line 46, as is described in more detail below. Alternatively, a compressor recirculation path and valve may be utilized to recirculate air flow from the compressor outlet back to the compressor inlet, thereby allowing oxygen to be removed in the cathode input line 32, which is described in more detail below.

A connector line 28 is provided to connect the anode input line 16 and the cathode input line 32 to provide hydrogen to the cathode side of the stack 12 by selectively controlling hydrogen to a cathode valve 58. An anode purge line 44 is provided to connect the cathode input line 32 to the anode purge valve 22 to provide a path for an oxygen depleted gas to fill the anode side of the stack 12, which is discussed in more detail below.

A cathode input valve 26 is provided on the cathode input line 32 to control the flow of air into the stack 12, and a cathode back-pressure valve 42 is provided in the cathode exhaust gas line 40 to selectively control the flow of cathode exhaust, to increase the pressure in the cathode side of the stack 12 and to provide a diffusion limitation during fuel cell system off time, as discussed in more detail below.

A variable shutdown load 50 is electrically coupled to the fuel cell stack 12 to cause oxygen to be consumed by providing a load across the stack 12 and causing the voltage to reach a predetermined level, which is discussed in more detail below. A controller 52 is capable of controlling the injector 20, the anode purge valve 22, the bleed/drain valve 24, the compressor 30, the cathode input valve 26, the cathode back-pressure valve 42, the cathode by-pass valve 48 and the by-pass valve 38. The controller 52 is also capable of calculating or estimating the cathode stoichiometry and the amount of oxygen depleted gas passing through the cathode exhaust gas line 40, which is discussed in more detail below.

Figure 2:
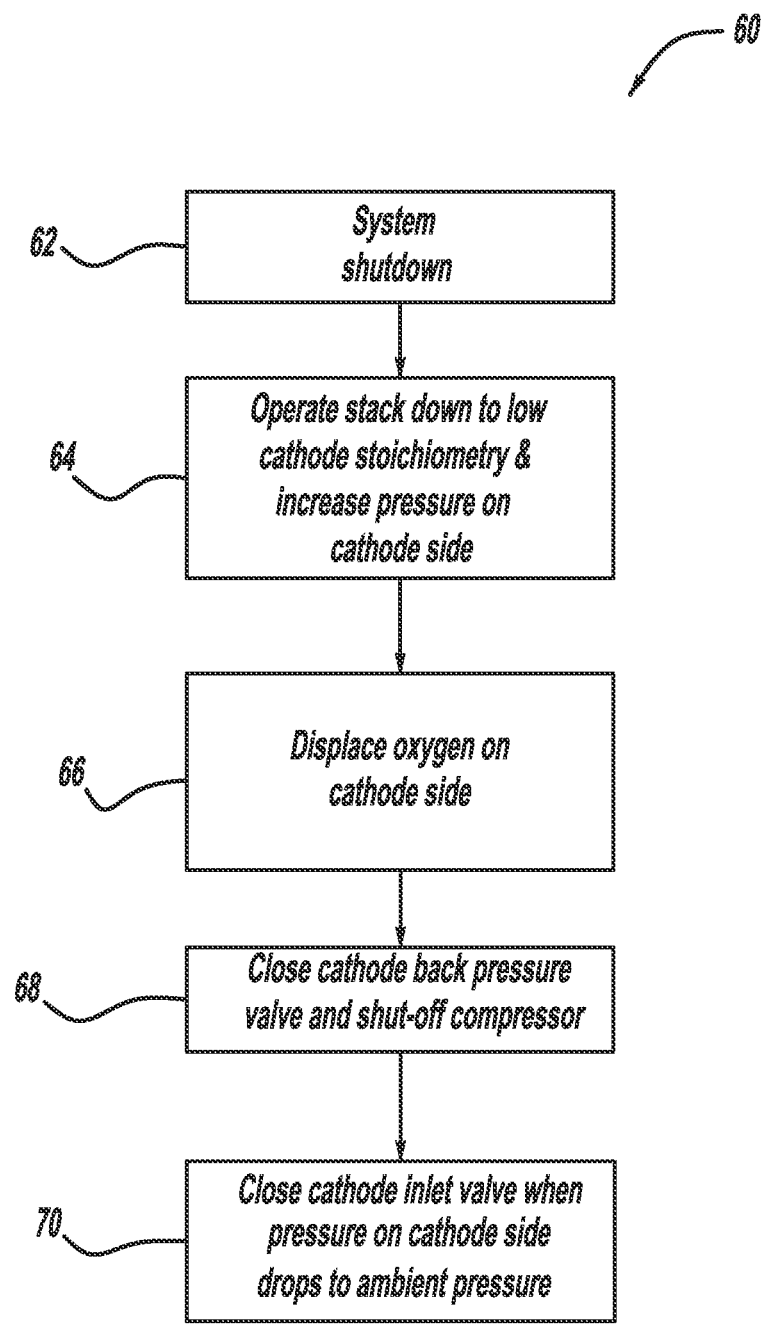
FIG. 2 is a flow diagram illustrating a non-limiting embodiment showing an oxygen depletion procedure at fuel cell system shut-down.

As discussed above, there is a need in the art for removing oxygen within a fuel cell stack upon shutdown to prevent the occurrence of air/hydrogen fronts during system stop and start cycles. FIG. 2 is a flow diagram 60 showing a method for depleting the oxygen in the cathode side upon shutdown of the fuel cell system 10 for the purpose of preventing the occurrence of air/hydrogen fronts within the fuel cell stack 12. This method starts after the controller 52 determines that the fuel cell system 10 has requested a shutdown at box 62. In one non-limiting embodiment, the controller 52 may determine shutdown has been requested when a vehicle or the fuel cell system 10 that is part of a vehicle has been turned off. However, those having skill in the art will readily recognize that a variety of triggers could indicate that the fuel cell system 10 has requested a shutdown.

Upon shutdown of the fuel cell system 10, the fuel cell stack 12 is operated down to a low cathode stoichiometry and the pressure on the cathode side is optionally increased at box 64 to begin to generate a volume of oxygen depleted gas within the stack 12 and the cathode exhaust line 40. As is discussed in more detail below, stack voltage is a function of cathode stoichiometry, therefore, a low cathode stoichiometry can be achieved by adjusting the variable shutdown load 50 value of the stack 12 and/or the cathode flow by adjusting the cathode back-pressure valve 42, the cathode by-pass valve 48 and the compressor 30, as is discussed in more detail below. Oxygen is depleted when the cathode stoichiometry is low, e.g., a cathode stoichiometry of approximately 1, because during low cathode stoichiometry the actual flow rate of the air or oxygen is approximately the same as the rate of the consumption of oxygen by the fuel cell stack 12 to generate the desired current. The optimum cathode stoichiometry may be determined by monitoring the entire stack voltage and adjusting the load 50 or cathode flow to achieve a predetermined stack voltage which correlates to a low cathode stoichiometry. The desired stack voltage to achieve a low cathode stoichiometry will vary depending on the fuel cell system used and in particular the number of cells in the stack. In one non-limiting embodiment, approximately 50 V provides the desired low cathode stoichiometry when the air flow rate is fixed by setting the speed of the compressor 30 and adjusting the variable shutdown load 50 value of the stack 12 and/or by adjusting the cathode back-pressure valve 42, as is discussed in more detail below.

To generate a volume of oxygen depleted gas, the fuel cell stack 12 is operated at a low cathode stoichiometry and the pressure is optionally increased on the cathode side at box 64 as is described in more detail below. Throughout the method as described herein, the pressure of the anode reactant side of the stack is typically maintained high relative to the pressure in the cathode side of the stack 12. This is done to ensure that the air does not flow into the anode when the anode bleed valve 24 is opened, as is apparent to those skilled in the art.

The cathode stoichiometry may be slowly lowered to avoid a situation where the fuel cell stack 12 needs more oxygen than is supplied, i.e., an under stoichiometry condition. The cathode stoichiometry should not be operated at an under stoichiometry condition because excess hydrogen will be pumped into the cathode side of the fuel cell stack 12. More particularly, excess hydrogen will be pumped into the individual fuel cells of the fuel cell stack 12 which have a cathode stoichiometry below 1 due to air flow maldistribution, meaning less air is pumped into certain fuel cells of the stack 12. When not enough air flow is provided to certain cells in the stack 12, an under stoichiometry condition exists, and the protons and electrons driven by the stack current will not have enough oxygen for reaction to form product water in that cell so will recombine as hydrogen gas (the above mentioned hydrogen pumping) which will exit through the cathode exhaust gas line 40. Excess hydrogen present in the cathode exhaust 40 may cause hydrogen emission constraints to be exceeded. In addition, the initial shutdown load 50 at the beginning of operating the fuel cell stack 12 down to a low cathode stoichiometry at the box 64 may be higher than average so as to more rapidly discharge the adsorbed hydrogen and oxygen within the fuel cell stack 12 to shorten the duration of the oxygen depletion process.

Either the measured or estimated voltage of the fuel cells in the fuel cell stack 12 or measured or estimated hydrogen emissions can be used by the controller 52 to estimate the cathode stoichiometry while operating the stack 12 down to a low cathode stoichiometry at the box 64. Measuring the voltage of the stack 12 is typically preferred as the components necessary are available in almost all fuel cell systems. Operating the fuel cell stack 12 at a low cathode stoichiometry may be achieved by using the measured or estimated voltage of the fuel cells in the stack 12 as a feedback to the controller 52 because stack voltage indicates the average cathode stoichiometry of the stack 12. An air flow meter may not provide sufficient resolution at low air flow, therefore, an air flow meter may not be available in the system to fine tune the cathode stoichiometry while operating the stack 12 down to a low cathode stoichiometry at low current densities. Air flow signals from a flow meter can have oscillations, therefore, using fixed compressor and valve command signals may be preferred over running a closed loop air flow control set point in this mode.

As is discussed above, the cathode stoichiometry may be adjusted by changing air flow, stack load, or a combination thereof. When using a fixed shutdown load 50 and adjusting air flow by adjusting the cathode input valve 26, and/or the cathode back-pressure valve 42, the cathode bypass valve 48 and the speed of the compressor 30, a flow meter may be utilized to adjust the flow of air from the compressor 30 before fixing the position of the cathode input valve 26 and/or the cathode back-pressure valve 42, the cathode bypass valve 48 and the speed of the compressor 30. For example, the speed of the compressor 30 may be increased and the cathode back-pressure valve 42 may be slightly closed to increase the pressure on the cathode side of the stack 12. An increased cathode side pressure may optionally be used to allow a backflow of oxygen depleted gas into the upstream portions of the cathode after the compressor is turned off. Using an anode pressure strategy specific to the shut down process also helps optimize the amount of hydrogen resulting in the cathode during off time, as is readily apparent to those having skill in the art. In addition, the nitrogen content in the anode side of the fuel cell stack 12 may be controlled during the shutdown process to optimize the hydrogen partial pressure.

The cathode stoichiometry is reduced at the box 64 by monitoring the voltage of the fuel cells in the stack 12 using the controller 52, the variable shutdown load 50 and adjusting the cathode back-pressure valve 42 so as to achieve the voltage which correlates to a low cathode stoichiometry, such as a cathode stoichiometry of 1. If the cathode stoichiometry drops below 1, a noticeable drop in the voltage of the fuel cells in the stack 12 will be observed because, as discussed above, stack voltage is an indication of the overall stoichiometry of the fuel cell stack 12. The individual cells can provide information on how many cells are operating in an over-stoichiometry or an under-stoichiometry state, and the controller 52 may limit the number of cells operating in an under-stoichiometry state to control the possibility of hydrogen pumping by adjusting the cathode back-pressure valve 42 accordingly to increase the cathode stoichiometry to 1. In addition, the controller 52 may limit the number of cells operating in an over-stoichiometry state to control excess oxygen residuals by adjusting the cathode back-pressure valve 42 accordingly to decrease the cathode stoichiometry to 1.

When using the shutdown load 50 a higher resolution secondary controller may be used to fine tune the shutdown load 50 to achieve a cathode stoichiometry of 1. Alternatively, and as mentioned above, a hydrogen sensor in the cathode exhaust line 40 could also be used to determine the level of hydrogen emitted from the fuel cell system and the cathode back-pressure valve 42 may be adjusted by the controller to achieve the desired level of hydrogen emitted, which also can indicate cathode stoichiometry. Since low cathode stoichiometry may not be calculated accurately, a stack cathode stoichiometry of 1 may be assumed when the stack voltage decreases toward a predetermined value, such as 200 V. Other stack voltages may be used for the predetermined value without departing from the scope of this invention.

In another non-limiting embodiment, a low flow of hydrogen may be added to the cathode input air by opening the hydrogen to a cathode valve 58 on the connector line 28 to finely control the cathode stoichiometry of the fuel cell stack 12 by consuming small amounts of oxygen. Hydrogen addition to the cathode, if well mixed, may also be used to achieve lower oxygen concentration levels in the cathode exhaust, thereby limiting the variation in oxygen levels from cell to cell in the fuel cell stack 12 by reducing the variation of oxygen concentration in the cathode flow from cell to cell.

Driving loads are not used during the shutdown procedure described herein. Therefore, auxiliary loads including the compressor 30 and coolant pumps, heaters, and battery charging may be used to provide the shutdown load 50 during the oxygen depletion process. For example, the stack 12 may be provided with a shutdown load 50 that includes a varying coolant heater load with a base end cell heater and coolant pump load.

Because the voltage of the fuel cell stack 12 is lower during the depletion step at the box 64, the voltage may not be adequate to power high voltage components, such as the compressor 30. Thus, the fuel cell stack 12 may need to be maintained at higher voltages suitable for compressor operation, or the compressor 30 may be supplied with voltage from a battery. Since battery operation capability is typically required for the start-up of the fuel cell system 10, a power supply from a battery is typically available. In addition, electrical architectures such as a boost converter may be available, thus the low voltage of the fuel cell stack 12 during this shutdown procedure may not prevent operation of high voltage components, as is readily apparent to those skilled in the art.

By controlling the stack average stoichiometry down to a low cathode stoichiometry that does not allow excessive hydrogen pumping into the cathode, an oxygen depleted air mixture is created without an excessive amount of hydrogen in the cathode side. As stated above, reducing the cathode stoichiometry to approximately 1 is desired at the box 64, and may be achieved through voltage feedback from the measured voltage of the fuel cells in the stack 12 by adjusting the cathode back-pressure valve 42 and stack load 50, and maintaining the speed of the compressor 30 constant. For example, stack voltage limitation control may be modified by altering the voltage set point and the gains for the controller 52 that performs the current limitation based on the error between the voltage set point and the actual stack voltage feedback.

Once the desired cathode stoichiometry is achieved, the oxygen in the cathode side is displaced at box 66. As discussed above, oxygen is depleted when the cathode stoichiometry is approximately 1 because the actual flow rate of the air or oxygen is approximately the same as the rate of the consumption of the oxygen or air by the fuel cell stack 12. By depleting the oxygen in the cathode side of the stack 12 with the compressor 30 operating, an oxygen depleted gas is created in the stack and flows out of the stack 12 and into the cathode exhaust line 40. Enough oxygen depleted gas is generated by this method to displace the cathode outlet volume including any by-pass plumbing such as the WVT unit by-pass plumbing directing cathode exhaust gas to the WVT unit 34, although not shown in the embodiment of FIG. 1 because the by-pass line 36 is provided in the cathode input line 22. The amount of time needed to displace the oxygen in the cathode exhaust line 40 will vary depending on the fuel cell system 10 used, but would approximately be the cathode outlet volume divided by the cathode volume flow rate. A non-limiting example of the amount of time needed is several seconds.

At the end of the generation of the oxygen depleted gas at the box 66, the cathode back-pressure valve 42 is closed at box 68. Closing the cathode back-pressure valve 42 reduces the amount of air flowing through the cathode side of the stack 12. Any cathode bypass valves in the system 10, such as the cathode by-pass valve 48 in the cathode by-pass line 46 may be opened during this step to prevent a surge in compressor operation or an increase in pressure that may otherwise occur during the time period after the back pressure valve is closed and before the compressor is shut off. As is readily apparent to those skilled in the art, if the compressor 30 is a positive displacement compressor, pressure build up would be relieved through a pressure relief valve. The compressor 30 is also shut off at the box 68, and due to the drop in cathode air flow that occurs upon compressor shutdown, oxygen depleted gas will expand into the cathode input line 32 and will displace the oxygen-containing air therein. Stack main contactors are also opened during this stage to isolate the stack high voltage side.

If the WVT unit 34 and the by-pass line 36 are provided in the fuel cell system 10, the oxygen depleted gas may expand through the WVT unit 34 by closing the by-pass valve 38, as well as through both the cathode input line 32 and the by-pass line 36 by partially opening the by-pass line valve 38, or through the WVT unit 34 and then the by-pass line 36 by keeping the by-pass valve 38 closed initially upon shutdown of the compressor 30, then opening the by-pass valve 38. In addition, the cathode inlet valve 26 is closed after the back flow of oxygen depleted gas has expanded into the cathode input line 32 sufficiently, and is done at box 70 once the cathode side pressure is at or near ambient. Any remaining air flow due to the compressor 30 spinning down may be by-passed around the stack 12 using the cathode by-pass line 46 by opening the cathode by-pass valve 48 or by recirculating flow through the compressor 30.

Any remaining oxygen within the cathode side of the fuel cell stack 12 may be consumed by applying the shutdown load 50. Alternatively, a small amount of oxygen may be left in the cathode side of the fuel cell stack 12 to consume hydrogen that may be hydrogen pumped when the bleed resistor engages or crosses over to the cathode side, to ensure that the amount of hydrogen in the cathode exhaust does not exceed hydrogen emission constraints. In addition, the anode pressure at shut down may be used to ensure that the amount of hydrogen in the cathode exhaust does not exceed hydrogen emission constraints.

To limit the amount of air pulled into the stack 12 after shutdown due to gas contraction and water vapor condensation, the stack 12 may be cooled prior to and during the oxygen depletion step at the box 64. Without a pressurized depletion followed by a back-flow of the oxygen depleted gas, the oxygen depleted gas may be pulled back into the upstream volumes by closing the cathode inlet valve 26 and cooling the stack 12 to draw the oxygen depleted gas from the exhaust into the fuel cell stack 12 due to gas contraction and water vapor condensation. Furthermore, a final hydrogen addition may be provided after the fuel cell stack 12 has cooled to maximize the available hydrogen.

To achieve reliable freeze starts, a method of drying the stack 12 to clear excess water within the stack 12 followed by a brief hydration step may be included to improve membrane conductivity upon fuel cell system restart. However, the cathode depletion step may accommodate the rehydration step required for ensuring reliable freeze starts, as operation of the fuel cell stack 12 at a cathode stoichiometry of approximately 1 is typically a wet operation, i.e., a high relative humidity operation. Alternatively, the WVT unit 34 may be controlled to achieve a desired relative humidity to provide adequate rehydration in the time frame needed to create the oxygen depleted gas.

Leaving too much hydrogen in the fuel cell stack 12 upon shutdown may lead to concerns regarding excessive hydrogen emissions upon restart of the fuel cell system 10. Thus, the anode side of the fuel cell stack 12 may be flushed with oxygen depleted gas which has been generated at elevated pressure according to the method described above. For example, by opening the anode purge valve 22 in the anode purge input line 44, closing the hydrogen flow into the anode input line 16 and opening the bleed/drain valve 24 a flow path is created to allow the oxygen depleted gas to flow up the cathode inlet line 32 through the anode purge input line 44 and into the anode side of the fuel cell stack 12 through the anode purge valve 22. In addition, the cathode inlet valve 26 may be closed upon flushing the anode side with oxygen depleted gas to prevent the high pressure gas from escaping through the cathode input line 32. If an anode recycle is provided, a recycle blocking valve or a recycle pump (not shown) is necessary to force the oxygen depleted gas through the stack 12 instead of bypassing through the anode recycle plumbing. This recycle blocking valve or pump would be located in the anode recirculation line 54 between the anode inlet of the stack 12 and the anode exhaust gas line 18 and is preferably located between the injector 20 (typically a jet pump driven recirculation device) and the water separation device 56. Once the anode side has been filled with the oxygen depleted gas, the cathode inlet valve 26 may be opened to discharge any remaining pressure and to displace air in the cathode inlet line 32 that is upstream of the cathode inlet valve 26.

The anode purge input line 44 may also provide an anode purge using the anode purge valve 22 for restart to remove the oxygen depleted gas in the anode side of the stack 12. Additionally the connector line 28 may also be used to supply hydrogen to the cathode side during freeze starts. A better quality valve may be used for the cathode inlet valve 26 than used for the back-pressure valve 42 to encourage preferential leakage on the cathode exhaust line 40 where there is a greater volume of oxygen depleted gas.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for creating an oxygen depleted gas in a fuel cell system where the system includes a fuel cell stack and a compressor, said method comprising:
    determining that the fuel cell system can be shutdown;
    cooling the fuel cell stack;
    adjusting a cathode exhaust valve and the compressor to increase the pressure on a cathode side of the fuel cell stack and applying a shutdown load to achieve a desired voltage and a desired cathode stoichiometry; wherein the cooling the fuel cell stack occurs after determining that the fuel cell system can be shutdown and wherein the cooling the fuel cell stack occurs prior to and/or concurrently to achieving the desired cathode stoichiometry;
    operating the fuel cell system at the desired voltage and the desired cathode stoichiometry so as to create a volume of oxygen depleted gas in the cathode side of the fuel cell system, a water vapor transfer unit and a water vapor transfer unit by-pass line;
    closing the cathode exhaust valve and water vapor transfer unit by-pass valves and shutting off the compressor;
    closing a cathode inlet valve when the pressure of the oxygen depleted gas on the cathode side drops to approximately ambient pressure; and
    controlling a nitrogen content in an anode side of the fuel cell stack to achieve a desired hydrogen partial pressure;
    wherein the oxygen depleted gas created in the cathode side is not fed to an anode side of the fuel cell stack.

2. The method according to claim 1 wherein the desired cathode stoichiometry is approximately 1 and not less than 1.

3. The method according to claim 1 further comprising calculating the volume of oxygen depleted gas created while operating the fuel cell system at the desired voltage.

4. The method according to claim 1 further comprising adding hydrogen after the stack is cooled to maximize the hydrogen available in the fuel cell stack.

5. The method according to claim 1 further comprising measuring the cathode flow in the stack to calculate the volume of oxygen depleted gas created while operating the fuel cell system at the desired cathode stoichiometry.

6. The method according to claim 1 wherein the desired cathode stoichiometry is achieved by adjusting cathode air flow and maintaining a fixed load.

7. The method according to claim 1 wherein fuel cell stack voltage, the voltage of one or more fuel cells, or a stack current sensor is used as a feedback to control the cathode stoichiometry.

8. The method according to claim 1 wherein cathode gas concentration or a cathode flow meter is used as a feedback to control cathode stoichiometry.

9. The method according to claim 1, further comprising maintaining a high pressure in the anode side of the fuel cell stack relative to a pressure in the cathode side of the fuel cell stack throughout the method.

10. A control system for creating an oxygen depleted gas in a fuel cell system where the fuel cell system includes a controller, a fuel cell stack and a compressor, wherein the control system is configured to:
    determine that the fuel cell system can be shutdown;
    cool the fuel cell stack after the determination that the fuel cell system can be shutdown;

adjust a cathode exhaust valve and the compressor to increase the pressure on a cathode side of the fuel cell stack and apply a shutdown load to achieve a desired voltage and a desired cathode stoichiometry; wherein the control system is configured to cool the fuel cell stack prior to and/or concurrently to achieving the desired cathode stoichiometry;

operate the fuel cell system at the desired voltage and the desired cathode stoichiometry so as to create a volume of oxygen depleted gas in the cathode side of the fuel cell system, a water vapor transfer unit and a water vapor transfer unit by-pass line;

control a nitrogen content in an anode side of the fuel cell stack to achieve a desired hydrogen partial pressure;

prevent the oxygen depleted gas created in the cathode side from flowing to the anode side of the fuel cell stack;

close the cathode exhaust valve and water vapor transfer unit by-pass valves and shutting off the compressor; and close a cathode inlet valve when the pressure of the oxygen depleted gas on the cathode side drops to approximately ambient pressure.

11. The control system according to claim 10 wherein the desired cathode stoichiometry is approximately 1 and not less than 1.

12. The control system according to claim 10 wherein the controller is configured to calculate the volume of oxygen depleted gas created while operating the fuel cell system at the desired voltage.

13. The control system according to claim 10 wherein the controller is further configured to add hydrogen after the stack is cooled to maximize the hydrogen available in the fuel cell stack.

* * * * *